(12) United States Patent
Cho et al.

(10) Patent No.: US 7,097,943 B2
(45) Date of Patent: Aug. 29, 2006

(54) UV-CURED MULTI-COMPONENT POLYMER BLEND ELECTROLYTE, LITHIUM SECONDARY BATTERY AND THEIR FABRICATION METHOD

(75) Inventors: Byung-Won Cho, Seoul (KR); Won-Il Cho, Seoul (KR); Hyung-Sun Kim, Seoul (KR); Un-Sek Kim, Seoul (KR); Hee-Woo Rhee, Seoul (KR); Yong-Tae Kim, Seoul (KR); Min-Kyu Song, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 482 days.

(21) Appl. No.: 10/275,384

(22) PCT Filed: Jan. 31, 2001

(86) PCT No.: PCT/KR01/00130

§ 371 (c)(1),
(2), (4) Date: May 22, 2003

(87) PCT Pub. No.: WO02/061873

PCT Pub. Date: Aug. 8, 2002

(65) Prior Publication Data

US 2005/0221194 A1    Oct. 6, 2005

(51) Int. Cl.
H01M 6/18        (2006.01)

(52) U.S. Cl. .................. 429/317; 429/309; 429/314; 429/316; 429/307; 429/144; 252/62.2

(58) Field of Classification Search .............. 429/309, 429/314, 316, 317, 307, 144; 252/62.2
See application file for complete search history.

(56) References Cited

U.S. PATENT DOCUMENTS 5,571,392 A * 11/1996 Sato et al. .................. 429/308

* cited by examiner

Primary Examiner—Laura Weiner
(74) Attorney, Agent, or Firm—Morrison & Foerster LLP

(57) ABSTRACT

The present invention relates to a UV-cured multi-component polymer blend electrolyte, lithium secondary battery and their fabrication method, wherein the UV-cured multi-component polymer blend electrolyte, comprises: A) function-I polymer obtained by curing ethyleneglycoldi-(meth)acrylate oligomer of formula 1 by UV irradiation, $CH_2=CR^1COO(CH_2CH_2O)_nCOCR^2=CH_2$ (1) wherein, $R^1$ and $R^2$ are independently a hydrogen or methyl group, and n is an integer of 3-20; B) function-II polymer selected from the group consisting of PAN-based polymer, PMMA-based polymer and mixtures thereof; C) function-III polymer selected from the group consisting of PVdF-based polymer, PVC-based polymer and mixtures thereof; and D) organic electrolyte solution in which lithium salt is dissolved in a solvent.

16 Claims, 4 Drawing Sheets

UV-CURED MULTI-COMPONENT POLYMER BLEND ELECTROLYTE, LITHIUM SECONDARY BATTERY AND THEIR FABRICATION METHOD

TECHNICAL FIELD

The present invention relates to a multi-component polymer blend electrolyte cured by ultraviolet (hereinafter referred to as "UV") rays and a lithium secondary battery and a fabrication method thereof. More particularly, the UV-cured multi-component polymer electrolyte comprises the following components:

A) a function-I polymer obtained by curing an ethyleneglycoldi(metha)acrylate oligomer having the following formula 1 by UV irradiation, $$CH_2=CR^1COO(CH_2CH_2O)_nCOCR^2=CH_2 \qquad (1)$$

wherein, $R^1$ and $R^2$ are independently a hydrogen or methyl, and n is integer of 3–20;

B) a function-II polymer selected from the group consisting of polyacrylonitrile (PAN), polymethylmethacrylate (PMMA) and mixtures thereof;

C) a function-III polymer selected from the group consisting of polyvinylidene fluoride (PVdF), polyvinyl chloride (PVC) and mixtures thereof; and D) an organic electrolyte solution in which a lithium salt is dissolved in an organic solvent.

BACKGROUND ART

Since it was reported the fact that a complex of polyethylene oxide (PEO) or polypropylene oxide (PPO) with a lithium salt showed an ionic conductivity in a solid state at ambient temperature, researches for utilizing it have been actively performed. However, according to the report of Armand et al., a polymer electrolyte using the PEO as a matrix exhibits a low ionic conductivity of below $10^{-8}$ S/cm due to its high tendency to crystallize at ambient temperature, and accordingly it could not be utilized. Recently, a polymer electrolyte of gel type which is plasticized after adding an organic electrolyte solution into a polymer matrix such as PMMA, PAN or PVC has been developed by G. Freuillade, M. Watanabe, E. Ysushida and Q. Wixwat et at. In the above plasticized polymer electrolyte in gel form, a lithium salt dissolved in an organic solvent presents in the polymer matrix having a dipole moment. In addition it exhibits an ionic conductivity of no less than $10^{-3}$ S/cm under a condition that the ratio of organic solvent and the lithium salt is optimized, and therefore, it has been highlighted as a polymer electrolyte system having a highest possibility to be utilized. However, in order to fabricate the above polymer electrolyte in gel type, a drying process should be performed after a heating process at over 100° C. is performed. In addition, because the matrix exhibits high viscosity in a melted state, the practical assembling process becomes complex, and the fabrication cost is increased.

U.S. Pat. No. 4,830,939 discloses a method for preparing a UV-cured polymer electrolyte by mixing a polyethylene composition having at least one unsaturated functional groups with a liquid electrolyte and then plasticizing the resultant with a cross-linking polymerization using a UV curing method. Although the UV-cured polymer electrolyte prepared by the above method exhibits a high ionic conductivity, the oligomer used as a matrix has a low mean molecular weight of 300–400, and therefore, it has a disadvantage in that its flexibility is relatively low.

In addition, European Patent No. 0 638 950 A1 discloses a method for preparing a UV cured polymer electrolyte which is plasticized with a cross-linking polymerization of a composition in which poly(ethylene glycol)-diacrylate (PEGDA) and a liquid electrolyte are mixed. The mean molecular weight of the oligimer used in this method, that is PEGDA, is limited to be no more than 440. However, the UV-cured polymer electrolyte prepared by the above method is a glassy polymer which has a high brittleness and therefore can not be stretched, to result a failure of its utilization.

SUMMARY OF THE INVENTION

Therefore, an object of the present invention is to provide a UV-cured polymer blend electrolyte which is superior in adhesive property to an electrode, compatibility with an organic electrolyte solution for a lithium secondary battery, ionic conductivity and mechanical strength, and has an improved processability in fabrication of a battery, and to provide a preparation method thereof.

Another object of the present invention is to provide a lithium secondary battery comprising the above UV-cured polymer blend electrolyte.

To achieve the above object of the present invention, there is provided a UV-cured polymer electrolyte which is obtained by curing with UV rays a combination of a UV-curable oligomer, a polymer which is superior in adhesive property to an electrode and ionic conductivity, and a polymer which is superior in compatibility with an organic solvent electrolyte.

In more detail, the above object of the present invention is achieved by providing a UV-cured polymer blend comprising the following components:

A) a function-I polymer obtained by curing an ethyleneglycoldi(metha)acrylate oligomer having the following formula 1 by UV irradiation, $$CH_2=CR^1COO(CH_2CH_2O)_nCOCR^2=CH_2 \qquad (1)$$

wherein, $R^1$ and $R^2$ are independently a hydrogen or methyl, and n is and integer of 3–20;

B) a function-II polymer selected from the group, consisting of polyacrylonitrile (PAN), polymethylmethacrylate (PMMA) and mixtures thereof;

C) a function-III polymer selected from the group consisting of polyvinylidene fluoride (PVdF), polyvinyl chloride (PVC) and mixtures thereof; and D) an organic electrolyte solution in which a lithium salt is dissolved in and organic solvent.

DETAILED DESCRIPTION OF THE INVENTION

Figure 1:
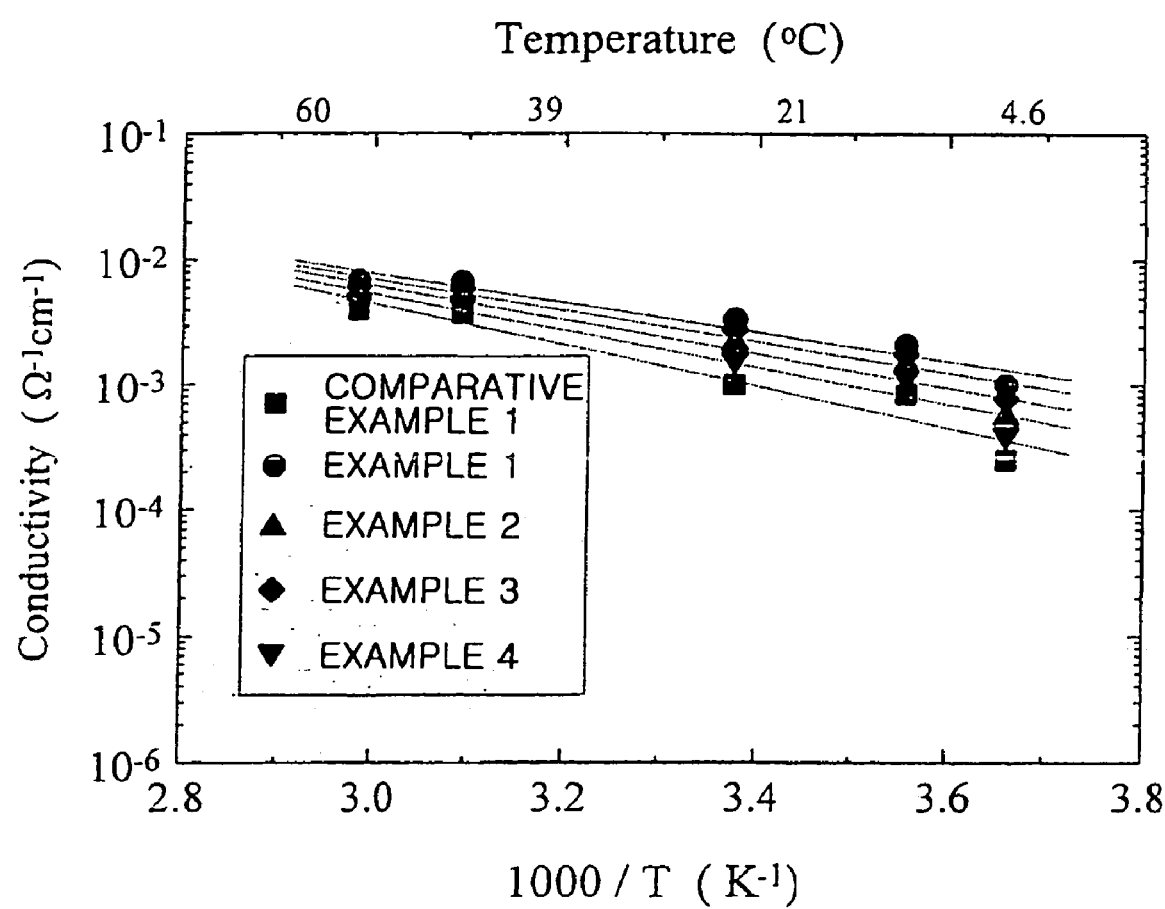
FIG. 1 is a graph showing the results of measuring ionic conductivities of the UV-cured multi-component polymer blends obtained in Examples 1–4 and that of the polymer electrolyte obtained in Comparative Example 1.

The present invention will now be described in detail with reference to accompanying drawings.

The present invention relates to a UV-cured multi-component polymer blend, a lithium secondary battery and fabrication method thereof. The UV-cured multi-component polymer electrolyte comprises the following components:

A) a function-I polymer obtained by curing an ethyleneglycoldi-(metha)acrylate oligomer having the following formula 1, by UV irradiation,

$$CH_2=CR^1COO(CH_2CH_2O)_nCOCR^2=CH_2 \quad (1)$$

wherein, $R^1$ and $R^2$ are independently a hydrogen or methyl, and n is an integer of 3–20;

B) a function-II polymer selected from the group consisting of polyacrylonitrile (PAN), polymethylmethacrylate (PMMA) and mixtures thereof;

C) a function-III polymer selected from the group consisting of polyvinylidene fluoride (PVdF), polyvinyl chloride (PVC) and mixtures thereof; and D) an organic electrolyte solution in which a lithium salt is dissolved in an organic solvent.

In the electrolyte of the present invention, the function-II polymer selected from the group consisting of PAN, PMMA and mixtures thereof and the function-III polymer selected from the group consisting of PVdF, PVC and mixtures thereof are added to the function-I polymer containing various lengths of ethylene oxide group, and thereby the liquid electrolyte can be easily contained in a polymer matrix. In addition, the entanglement of the polymer chains obtained by polymerizing the oligomer represented by the formula 1 with the function-II and III polymers makes the brittleness which is the disadvantage of the conventional UV-cured polymer electrolyte be reduced, and also improve rubber-like property and other properties of the electrolyte.

Although the electrolyte of the present invention actually has a semi-interpenetrating polymer network, herein, it is called as a "blend" for convenience sake.

The oligomer having the formula 1 includes ethlenegly-coldiacrylate ($R^1$ and $R^2$ are hydrogen), ethyleneglycold-imethacrylate ($R^1$ and $R^2$ are methyl) or mixtures thereof having a molecular weight of 200–2000. The amount of the oligomer used can be adjusted in the range of 5–95% of the entire polymer mixture according to the characteristics required. The oligomer is liquid at the temperature for fabricating the electrolyte and therefore superior in fluidity. In addition, it is polymerized with UV rays, and therefore, the fabricating process can be controlled by the UV radiating condition.

The polymers of PAN and PMMA group used in the present invention can impregnate a lot of electrolyte and are superior in adhesive properties and compatibility with the organic electrolyte solution for lithium secondary batteries. The polymers of PVdF and PVC group have rubber-like properties and are also superior in mechanical strength and ionic conductivity.

It is preferred that the polymer of PAN group is selected from the group consisting of polyacrylonitrile and poly (acrylonitrile-methylacrylate), and the polymer of PMMA group is selected from the group consisting of polymethylmethacrylate, poly(methylmethacrylate-co-ethylacrylate) and poly-(methylmethacrylate-co-methacrylic acid). In addition, It is preferred that the polymer of the PVdF group is selected from the group consisting of polyvinylidene difluoride and poly(vinylidenedifluoride-hexafluoropro-phylene), and, the polymer of PVC group is selected from the group consisting of polyvinylchloride and poly(vinyl-chloride-co-acrylonitrile).

The lithium salt included in the organic electrolyte solution of the present invention is the lithium salt which is generally used for lithium secondary batteries. Examples may include $LiPF_6$, $LiClO_4$, $LiAsF_6$, $LiBF_4$, $LiCF_3SO_3$, $Li(CF_3SO_2)_2N$, etc., and $LiPF_6$ or $LiClO_4$ is more preferable.

Examples of the organic solvent used in the organic electrolyte solution may include ethylene carbonate (EC), propylene carbonate (PC), diethyl carbonate (DEC), dimethyl carbonate (DMC), ethylmethyl carbonate (EMC) or mixtures thereof. In order to improve low temperature characteristics of batteries, methyl acetate (MA), methyl propionate (MP), ethyl acetate (EA), ethyl propionate (EP), butylene carbonate (BC), γ-butyrolactone (γ-BL), 1,2-dimethoxyethane (DME), dimethyl acetamide (DMA), tetrahydrofuran or mixtures thereof can further be added to the above organic solvent. The amount of the organic electrolyte solution used is preferable to be adjusted in the range of 100–2000% by weight of the entire polymer mixture.

The electrolyte of the present invention may further include an initiator for UV curing, a curing accelerator, a plasticizer, a porous filler and the like optionally.

The initiator for UV curing which can be used in the present invention may not be limited if it is capable of generating a radical by UV rays radiated. Examples of such initiator may include 2,2-dimethoxy-2-phenylacetophenone, 2-methoxy-2-phenylacetone, benzyl-dimethyl-ketal, ammonium persulfate, benzophenone, ethyl benzoin ether, isopropyl benzoin ether, α-methyl benzoin ether, benzoin phenyl ether, 2,2-diethoxy acetophenone, 1,1-dichloro acetophenone, 2,-hydroxy-2-methyl-1-phenylpropane-1-one, 1-hydroxy cyclohexyl phenyl ketone, anthraquinone, 2-ethyl anthraquinone, 2-chloro anthraquinone, thioxantone, isopropyl thioxantone, chloro thioxantone, 2,2-chloro benzophenone, benzyl benzoate, bezoyl and the like. The initiator can be generally used in an amount of 0.1–5.0% by weight of the entire polymer used for the UV-cured polymer layer.

The curing accelerator used for improving the curing speed in the present invention is an amine such as trimethylamine, tributylamine, triethanolamine, N-benzyldimethy-lamine and the like. The curing accelerator can be generally used in an amount of 1.0–5.0% by weight of the entire polymer used for the UV-cured polymer layer.

Examples of the plasticizer which can be used in the present invention may include N,N-dimethylacetamide (DMA), N,N-dimethylformamide (DMF), dimethyl carbonate (DMC), ethylene carbonate (EC), ethyl methyl carbonate (EMC), propylene carbonate (PC), acetonitrile and mixtures thereof, but not limited thereto. The amount of plasticizer used for the polymer electrolyte can be preferably adjusted in the range of 100–2000% by weight to the entire polymer mixture.

Examples of the filler which can be used for the present invention may include $TiO_2$, $BaTiO_3$, $Li_2O$, LiF, LiOH, $Li_3N$, BaO, $Na_2O$, MgO, $Li_2CO_3$, $LiAlO_2$, $SiO_2$, $Al_2O_3$, PTEE, an organic filler, a polymeric filler or mixtures thereof. The filler can improve porosity and mechanical strength of the electrolyte. The amount of the filler added is preferably no more than 20% by weight of the entire polymer mixture.

Besides the above materials, the electrolyte of the present invention may include various types of additives such as an adhesive property enhancing material and a filler for improving the mechanical strength and interfacial performance with the electrode.

A method for preparing the polymer electrolyte according to the present invention will now be described. After an oligomer having the formula 1, a function-II polymer and a function-III polymer are added to an organic electrolyte solution and/or to an organic solvent, the resultant is dissolved or swelled by stirring at ambient temperature or in the range of 50–150° C. It is preferred that,the stirring is performed for at least 3 hours in order to achieve mixing sufficiently. To the above mixture, an initiator for UV curing and a curing accelerator are added, and then the solution is additionally stirred for from 30 seconds to 10 minutes. After that, the resulting solution is cast onto a Mylar film or glass plate at a suitable thickness of no more than 100 μm, and then the curing of the oligomer is performed by radiating UV rays alone or combined with other methods. If it is necessary, an organic electrolyte solution may be further added to the obtained polymer electrolyte film. In order to exclude the effects of moisture, all of the above processes are preferably performed under the condition in which the humidity is below 10 ppm at ambient temperature. Curing with UV rays, heat or electron beam highly depends on the intensity of energy sources, the composition of polymer mixture, the thickness of film and the atmospheric condition.

The UV-cured multi-component polymer blend electrolyte can be used for fabricating various types of lithium secondary batteries. Examples include lithium secondary batteries with a mono-cell structure in which an anode/a UV-cured multi-component polymer electrolyte/a cathode are sequentially stacked, or lithium secondary batteries with bi-cell structure in which a cathode/a UV-cured multi-component polymer electrolyte/an anode/a UV-cured multi-component polymer electrolyte/a cathode are sequentially stacked. If it is necessary, a stacked structure in which the above bi-cell structure are sequentially stacked again may be used.

The anode and the cathode used for lithium secondary batteries are made by mixing an appropriate amount of an active material, a conductive material, a binder and an organic solvent, followed by casting the obtained mixture onto both sides of copper and aluminum thin plate respectively, and then drying and rolling the resulting plate as in the conventional method. In more detail, the, anode is made of at least one material selected from the group consisting of graphite, cokes, hard carbon, tin oxide, a lithiated material thereof, lithium and lithium alloys. The cathode is made at least one material selected from the group consisting of $LiCoO_2$, $LiNiO_2$, $LiNiCoO_2$, $LiMn_2O_4$, $V_2O_5$ and $V_6O_{13}$. The organic electrolyte solution injected when batteries are fabricated is a solution selected from the group consisting of solutions of a lithium salt in EC-DMC, EC-DEC, EC-EMC, EC-PC and mixtures thereof, and solutions in which any one of MA, MP, EA, EP, BC, γ-BL,DME, DMA and THF is added to the above lithium salt solutions, respectively. The copper and aluminum grids can be used in the form of a plate, a punched plate, an expanded plate, a porous plate or the like. If the organic electrolyte solution is injected after stacking, a punched plate, an expanded plate and a porous plate are more advantageous for efficient injection of the solution.

The present invention will now be described in more detail by the following Examples, to which the present invention is not limited.

EXAMPLES

Example 1

A 5 wt % solution of a mixture (1:1 by weight) of polymethylmethacrylate (Polyscience, molecular weight 100,000) and P(VdF-HFP) (Atochem Kynar 2801) which is in polyvinylidene fluoride group in DMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$of 29 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Example 2

A 5 wt % solution of a mixture (1:1 by weight) of polyacrylonitrile (Polyscience, molecular weight 150,000) and P(VdF-HFP) (Atochem Kynar 2801) which is in polyvinylidene fluoride group in DMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Example 3

A 5 wt % solution of a mixture (1:1 by weight) of polymethylmethacrylate (Polyscience, molecular weight 100,000) and polyvinylchloride (Aldrich, molecular weight 150,000) in DMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes; the electrodes were inserted into a vacuum casing. A 1M $LiPF_6$ solution in EC-EMC was injected into the casing, and then the casing was sealed, thereby to obtain a lithium secondary battery.

Example 4

A 5 wt % solution of a mixture (1:1 by weight) of polyacrylonitrile (Polyscience, molecular weight 150,000) and polyvinylchloride (Aldrich, molecular weight 150,000) in DMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Example 5

A 5 wt % solution of a mixture (1:1 by weight) of polymethylmethacrylate (Polyscience, molecular weight 100,000) and P(VdF-HFP) (Atochem Kynar 2801) which is in polyvinylidene fluoride group in EMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Example 6

A 5 wt % solution of a mixture (1:1 by weight) of polymethylmethacrylate (Polyscience, molecular weight 100,000) and P(VdF-HFP) (Atochem Kynar 2801) which is in polyvinylidene fluoride group in DMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Example 7

A 5 wt % solution of a mixture (1:1 by weight): of polyacrylonitrile (Polyscience, molecular weight 150,000) and P(VdF-HFP) (Atochem Kynar 2801) which is in polyvinylidene fluoride group in DMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Example 8

A 5 wt % solution of a mixture (1:1:1 by weight) of polymethylmethacrylate (Polyscience, molecular weight 100,000), P(VdF-HFP) (Atochem Kynar 2801) which is in polyvinylidene fluoride group and polyacrylonitrile (Polyscience, molecular weight 150,000) in DMC was prepared. 1 g of the obtained solution was added to 2 g of a liquid electrolyte solution which is a 1M $LiPF_6$ solution in a mixture (1:1 by weight) of ethylene carbonate/dimethyl carbon containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Example 9

A 5 wt % solution of a mixture. (1:1:1:1 by weight) of polymethylmethacrylate (Polyscience, molecular weight 100,000), P(VdF-HFP) (Atochem Kynar 2801) which is in polyvinylidene fluoride group, polyacrylonitrile (Polyscience, molecular weight 150,000) and polyvinylchloride (Aldrich, molecular weight 150,000) in DMC was prepared. 1 g of the obtained solution was added to 2 g of a liquid electrolyte solution which is a 1M $LiPF_6$ solution in a mixture (1:1 by weight) of ethylene carbonate/dimethyl carbonate containing 1 g of polyethylene glycol diacrylate oligomer (Aldrich Co., molecular weight 742). The resulting mixture was mixed enough to be homogeneous for at least 3 hours and then cast onto a Mylar film at a thickness of 50 μm with a doctor blade method. UV rays were irradiated onto the obtained film with a UV lamp having a power of 100 W for about 1.5 hours to induce a polymerization of the oligomer, thereby to obtain a uniform UV-cured multi-component polymer blend electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Comparative Example 1

2 g of polyethyleneglycoldiacrylate oligomer (Aldrich, molecular weight 742) was added to 2 g of a liquid electrolyte solution of a 1M $LiPF_6$ solution in a mixture (1:1 by weight) of ethylene carbonate/ethyl methyl carbonate. The resulting mixture was mixed enough and then cast onto a glass plate. UV rays were irradiated onto the obtained plate with a UV lamp having a power of 100 W for about 1.5 hours to induce a polymerization of the oligomer, thereby to obtain a UV-cured polymer electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were inserted into a vacuum casing. A 1M $LiPF_6$ solution in EC-EMC was injected into the casing, and then the casing was sealed, thereby to obtain a lithium secondary battery.

Comparative Example 2

2 g of polyvinylidenefluoride (PVdF, Kynar 761) was added to 14 g of a liquid electrolyte solution of a 1M $LiPF_6$ solution in a mixture (1:1 by weight) of ethylene carbonate/ethyl methyl carbonate. The resulting mixture was mixed for 3 hours at 150° C. and then cast onto a Mylar film at a thickness of 50 μm with a doctor blade method, to obtain a polymer electrolyte. The obtained electrolyte was closely adhered onto both sides of a graphite anode and put together with a lamination process. The obtained plate was cut so as to be 3 cm×4 cm in size and then stacked it alternately with a $LiCoO_2$ of 2.9 cm×3.9 cm in size. After terminals were welded onto the electrodes, the electrodes were inserted into a vacuum casing. A 1M $LiPF_6$ solution in EC-EMC was injected into the casing, and then the casing was sealed, thereby to obtain a lithium secondary battery.

Test Results

Example 10

Ionic conductivities of the UV-cured multi-component polymer blends obtained in Examples 1–4 and of the polymer electrolyte obtained in Comparative Example 1 were measured, and the results are shown in FIG. 1. As shown in FIG. 1, the ionic conductivities of the UV-cured multi-component polymer blend according to the present invention are $10^{-3}$ S/cm or more at ambient temperature and superior to that of the conventional UV-cured polymer electrolyte. Furthermore, a stretching ratio of the polymer blend electrolyte of the present invention was 50%–90% higher than that of the electrolyte of Comparative Example 1, and accordingly, its mechanical property was also improved.

Example 11

Charge/discharge tests were performed by charging the batteries obtained in Examples 1–9 and Comparative Examples 1–2 with C/2 constant current and 4.2V constant voltage, and followed by discharging them with C/2 constant current, in order to examine electrode capacities based on cathodes and a cycle life. The results are shown in FIG. 2.

Figure 2:
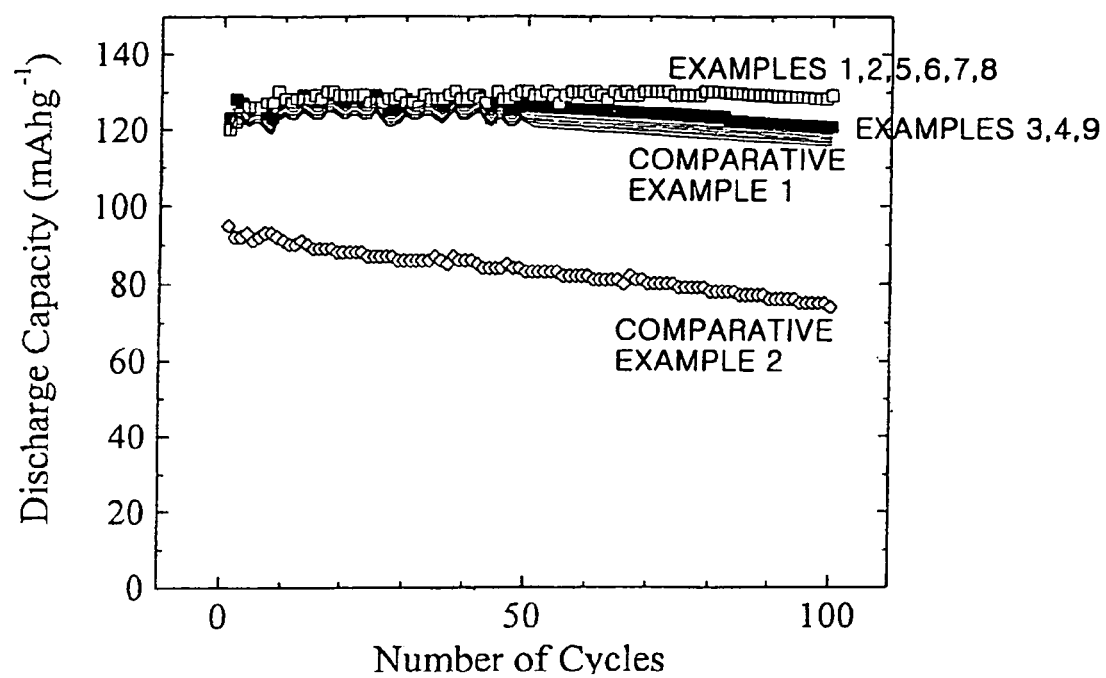
FIG. 2 is a graph showing the testing results of electrode capacities and cycle life of lithium secondary batteries obtained in Examples 1–9 and in Comparative Examples 1 and 2.

As shown in FIG. 2, the lithium secondary batteries according to Examples 1–9 comprising the polymer blend electrolyte of the present invention are superior to those of the lithium secondary batteries according to Comparative Examples 1 and 2. In addition, the lithium secondary batteries of the present invention are superior in cycle characteristics in which their capacities are not reduced regardless of repeated charging/discharging. Therefore, it was found that the polymer blend electrolyte according to the present invention improves the electrode capacity and cycle life of batteries. Such improvement seems to be resulted from the reduction of interfacial resistance due to a strong adhesive force between the electrode and the polymer blend electrolyte, and superior ionic conductivity of the polymer blend electrolyte.

Example 12

Figure 3A:
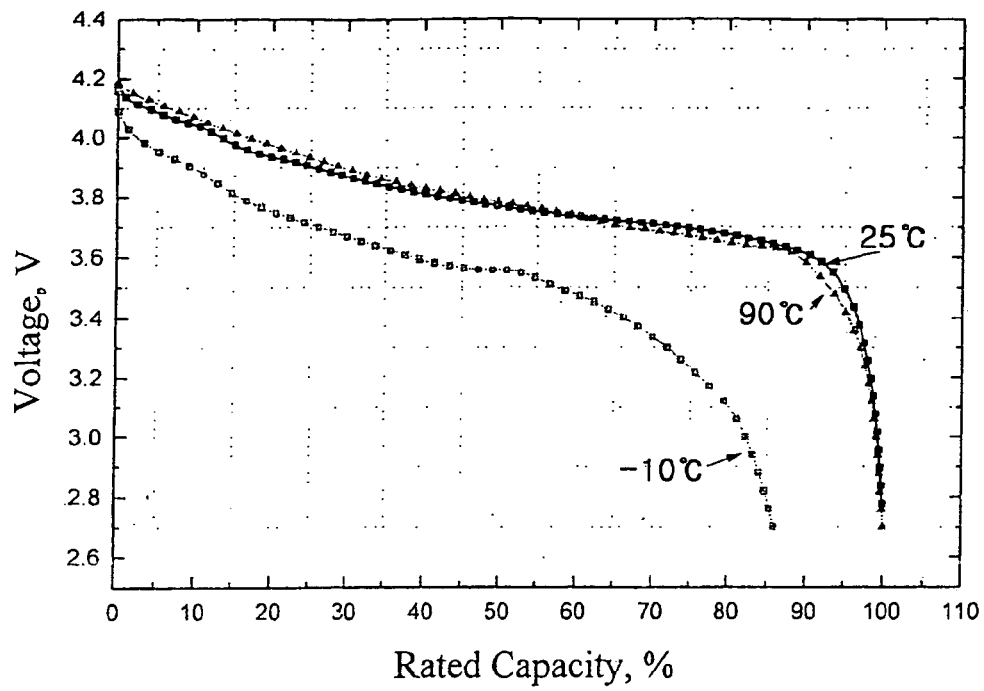
FIG. 3a is a graph showing the test results of low and high temperature characteristics of the lithium secondary battery of the present invention obtained in Example 1.
Figure 3B:
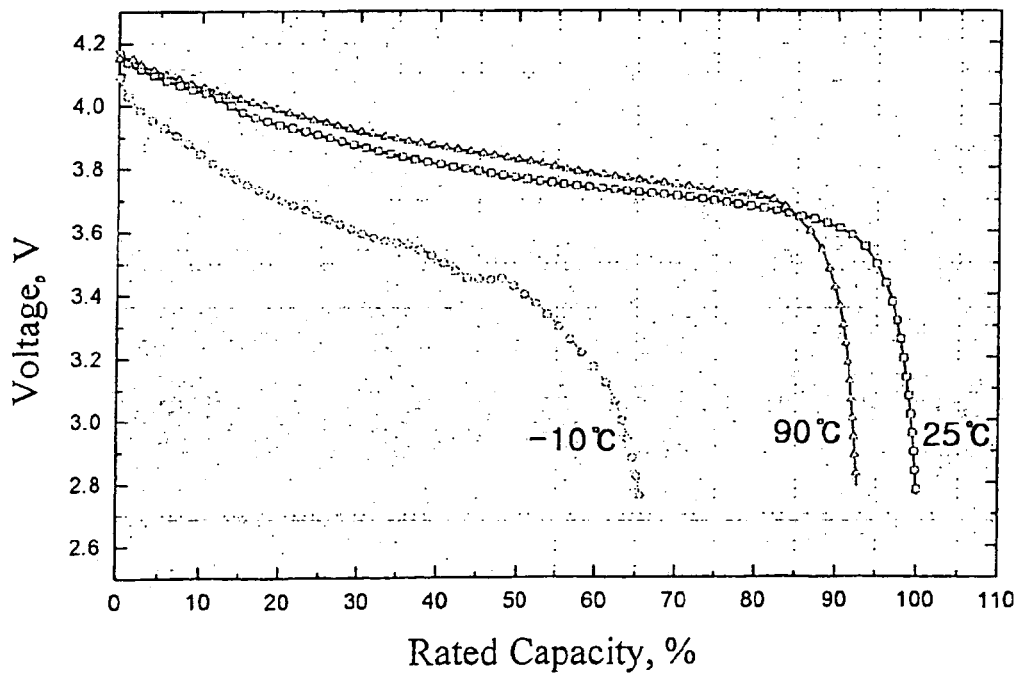
FIG. 3b is a graph showing the test results of low and high temperature characteristics of the lithium secondary battery obtained in Comparative Example 1.

Low- and high-temperature characteristics of the lithium secondary batteries obtained in Example 1 and Comparative Example 1 were tested with a charging/discharging method in which the batteries were charged with C/2 constant current and 4.2V constant voltage, and then discharged with C/5 constant current. The results are shown in FIGS. 3a and 3b. As shown in FIGS. 3a and 3b, low- and high-temperature characteristics of the lithium secondary battery comprising the polymer blend electrolyte according to the present invention has been improved more than that of the battery comprising the conventional polymer electrolyte.

Example 13

Figure 4A:
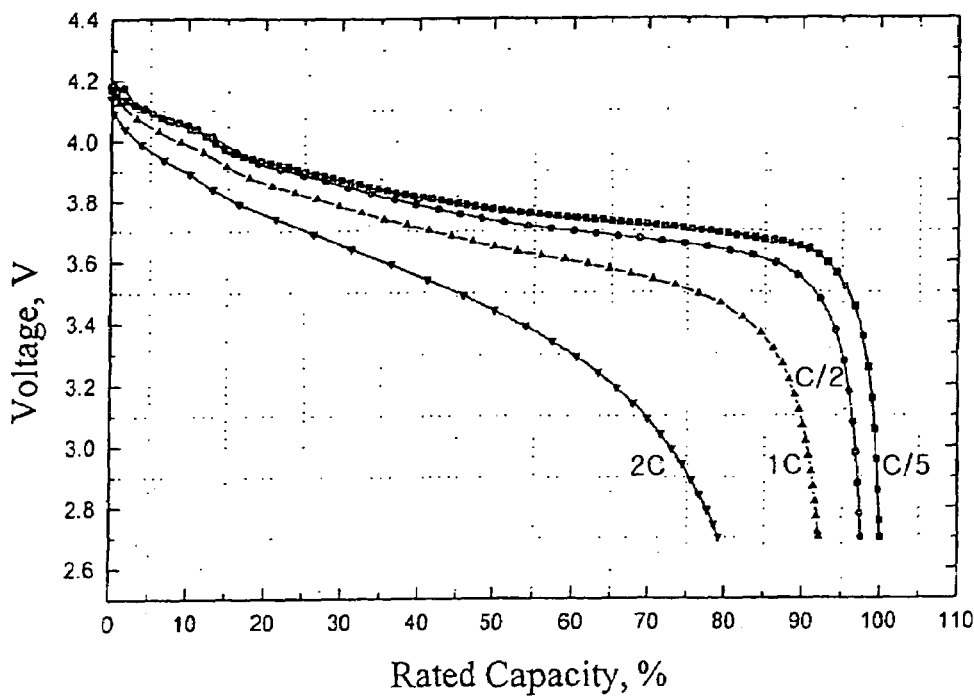
FIG. 4a is a graph showing the test results of a high-rate discharge characteristics of the lithium secondary battery of the present invention obtained in Example 1.
Figure 4B:
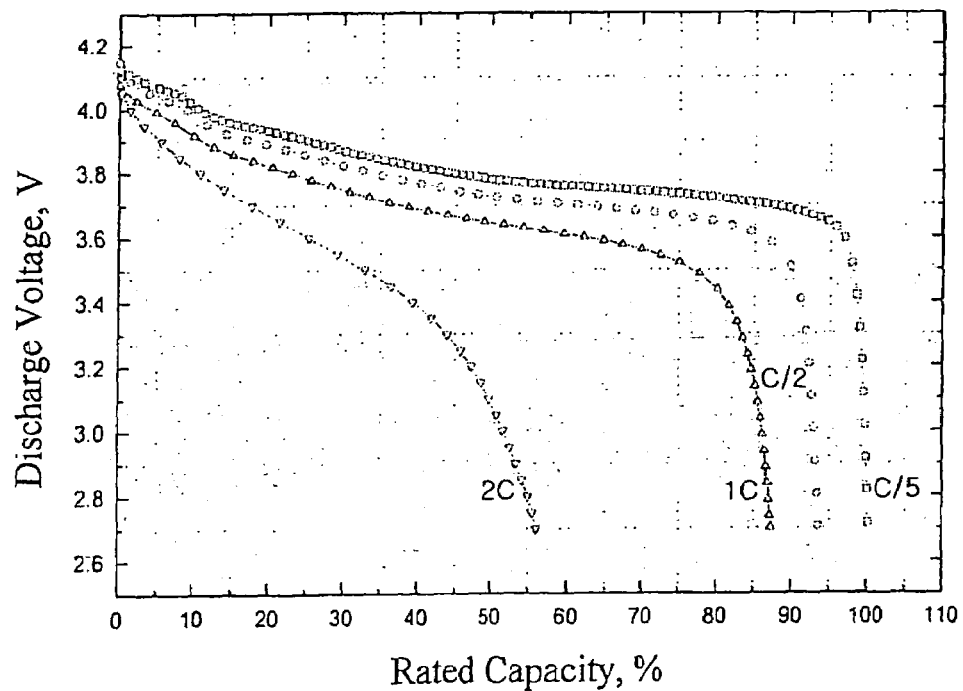
FIG. 4b is a graph showing the test results of a high-rate discharge characteristics of the lithium secondary battery obtained in Comparative Example 1.

High-rate discharge characteristics of the lithium secondary batteries obtained in Example 1 and Comparative Example 1 were tested with a charging/discharging method in which the battery was charged with C/2 constant current and 4.2V constant voltage, and then discharged while changing the constant current into C/5, C/2, 1 C, and 2 C. The results are shown in FIGS. 4a and 4b. As shown in FIGS. 4a and 4b, the lithium secondary battery comprising the polymer blend electrolyte according to the present invention exhibited 95% and 90% of capacities, respectively, when discharged with 1 C and 2 C for 0.2 C discharging. However, the battery of the Comparative Example 1 exhibited low performances of 87% and 56%, respectively. Therefore, it was found that high-rate discharge characteristics of the lithium secondary battery comprising the polymer blend electrolyte according to the present invention is superior to those of the conventional battery.

INDUSTRIAL APPLICABILITY

As so far described, the polymer blend electrolyte according to the present invention is superior in adhesive property and mechanical stability. According to the present invention, it is possible to provide a lithium secondary battery which is superior in low- and high-temperature characteristics, high-rate discharge characteristics, capacity, cycle life and stability. Accordingly, the present invention can be applied to various types of small electronic appliances, communication devices and as a power source for an electric car.

The invention claimed is:

1. A UV-cured multi-component polymer blend electrolyte comprising:
   A) a function-I polymer obtained by curing an ethyleneglycoldi-(metha)acrylate oligomer having the following formula 1 by UV irradiation, $$CH_2=CR^1COO(CH_2CH_2O)_nCOCR^2=CH_2 \qquad (1)$$

wherein, $R^1$ and $R^2$ are independently a hydrogen or methyl, and n is an integer of 3–20;
   B) a function-II polymer selected from the group consisting of polyacrylonitrile (PAN), polymethylmethacrylate (PMMA) and mixtures thereof;
   C) a function-III polymer selected from the group consisting of polyvinylidene fluoride (PVdF), polyvinyl chloride (PVC) and mixtures thereof; and
   D) an organic electrolyte solution in which a lithium salt is dissolved in an organic solvent.

2. The electrolyte according to claim 1, wherein the polymer of PAN group is selected from the group consisting of polyacrylonitrile, and poly(acrylonitrile-methylacrylate), the polymer of PMMA group is selected from the group consisting of poly(methyl methacrylate), poly(methyl methacrylate-co-ethyl acrylate), poly(methyl methacrylate-co-methacrylic acid), the PVdF group is selected from the group consisting of polyvinylidene difluoride, poly(vinylidenedifluoride-hexafluoroprophylene), and the polymer of PVC group is selected from the group consisting of polyvinylchloride, poly(vinylchloride-co-acrylonitrile).

3. The electrolyte according to claim 1, wherein the lithium salt is selected from the group consisting of $LiPF_6$, $LiClO_4$, $LiAsF_6$, $LiBF_4$, $LiCF_3SO_3$, $Li(CF_3SO_2)_2N$ and combinations thereof.

4. The electrolyte according to claim 1, wherein the organic solvent is ethylene carbonate, propylene carbonate, diethyl carbonate, dimethyl carbonate, ethyl methyl carbonate or mixtures thereof.

5. The electrolyte according to claim 4, wherein the organic solvent further comprises a solvent which is selected from the group consisting of methyl acetate, methyl propionate, ethyl acetate, ethyl propionate, butylene carbonate, γ-butyrolactone, 1,2-dimetoxyethane, dimethylacetamide, tetrahydrofuran and mixtures thereof.

6. The electrolyte according to claim 1, further comprises at least one component selected from the group consisting of a plasticizer, a porous filler, an initiator for UV curing and a curing accelerator.

7. The electrolyte according to claim 6, wherein the plasticizer is selected from the group consisting of N,N-dimethylacetamide, N,N-dimethylformamide, dimethyl carbonate, ethylene carbonate, ethyl methyl carbonate, propylene carbonate, acetonitrile and mixtures thereof.

8. The electrolyte according to claim 6, wherein the porous filler is selected from the group consisting of $TiO_2$, $BaTiO_3$, $Li_2O$, LiF, LiOH, $Li_3N$, BaO, $Na_2O$, MgO, $Li_2CO_3$, $LiAlO_2$, $SiO_2$, $Al_2O_3$, PTEE, an organic filler, a polymeric filler and mixtures thereof.

9. The electrolyte according to claim 6, wherein the initiator for UV-curing is selected from the group consisting of 2,2-dimethoxy-2-phenylacetophenone, 2-methoxy-2-phenylacetone, benzyl-dimethyl-ketal, ammonium persulfate, benzophenone, ethyl benzoin ether, isopropyl benzoin ether, a-methyl benzoin ether, benzoin phenyl ether, 2,2-diethoxy acetophenone, 1,1-dichloroacetophenone, 2-hydroxy-2-methyl-1-phenyipropane-1-one, 1-hydroxycyclohexyl phenyl ketone, anthraquinone, 2-ethylanthraquinone, 2-chloroanthraquinone, thioxantone, isopropyl thioxantone, chlorothioxantone, 2,2-chlorobenzophenone, benzyl benzoate, bezoyl benzoate and mixtures thereof.

10. The elect rolyte according to claim 6, the curing accelerator is an amine compound.

11. The elect rolyte according to claim 10, wherein the amine compound is selected from the group consisting of trimethylamine, tributylamine, triethanolamine and N-benzyldimethylamine.

12. A lithium secondary battery comprising a cathode, an anode and the electrolyte according to claim 1.

13. The battery according to claim 12, wherein the cathode comprises at least one cathode active material selected from the group consisting of $LiCoO_2$, $LiNiO_2$, $LiNiCoO_2$, $LiMn_2O_4$, $V_2O_5$ and $V_6O_{13}$.

14. The battery according to claim 12, wherein the anode comprises at least one anode active material selected from the group consisting of graphite, cokes, hard carbon, tin oxide, lithiated materials thereof, lithium and lithium alloys.

15. The battery according to claim 12, which is in a mono-cell structure.

16. The battery according to claim 12, which is in a bi-cell structure.

* * * * *